UNITED STATES PATENT OFFICE.

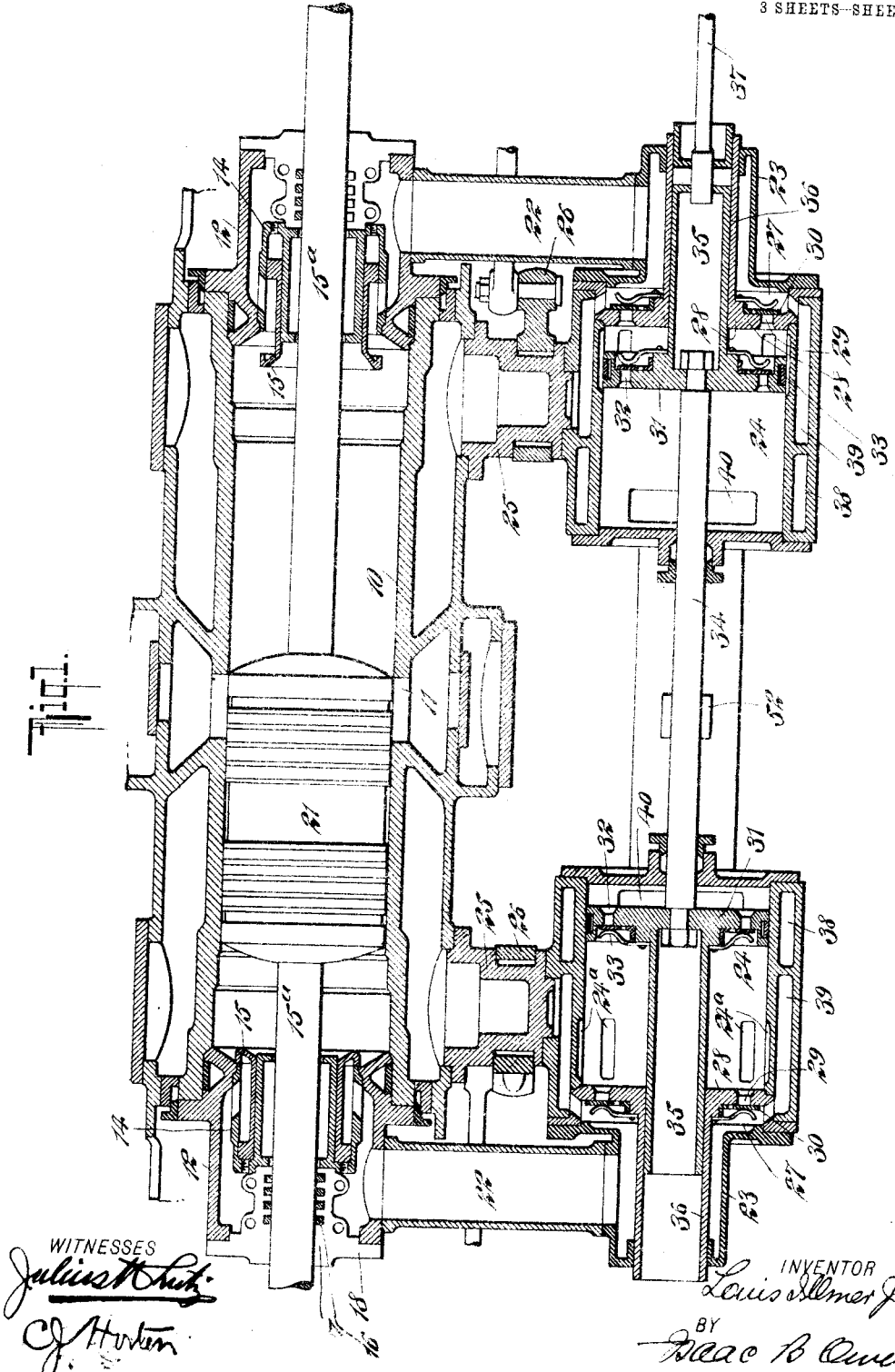

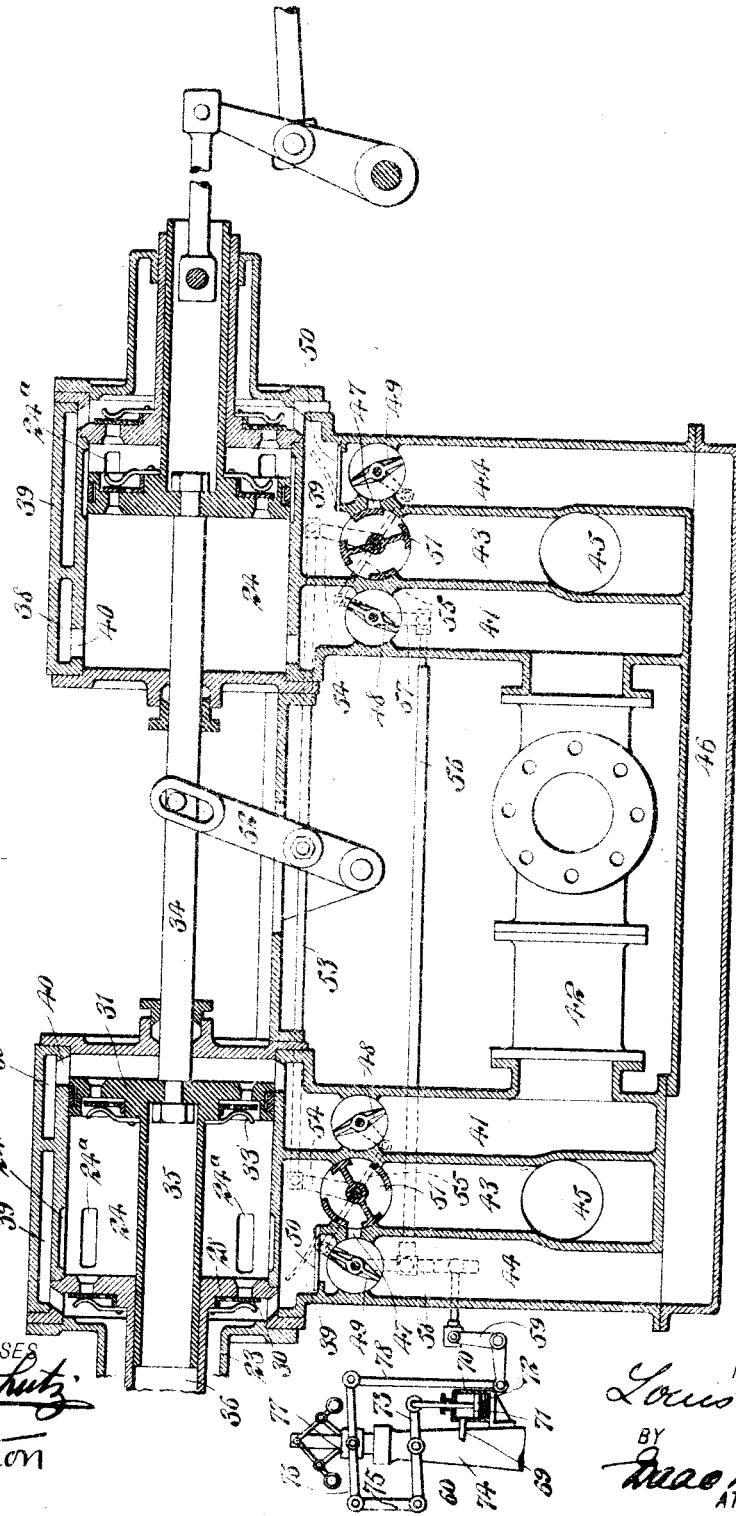

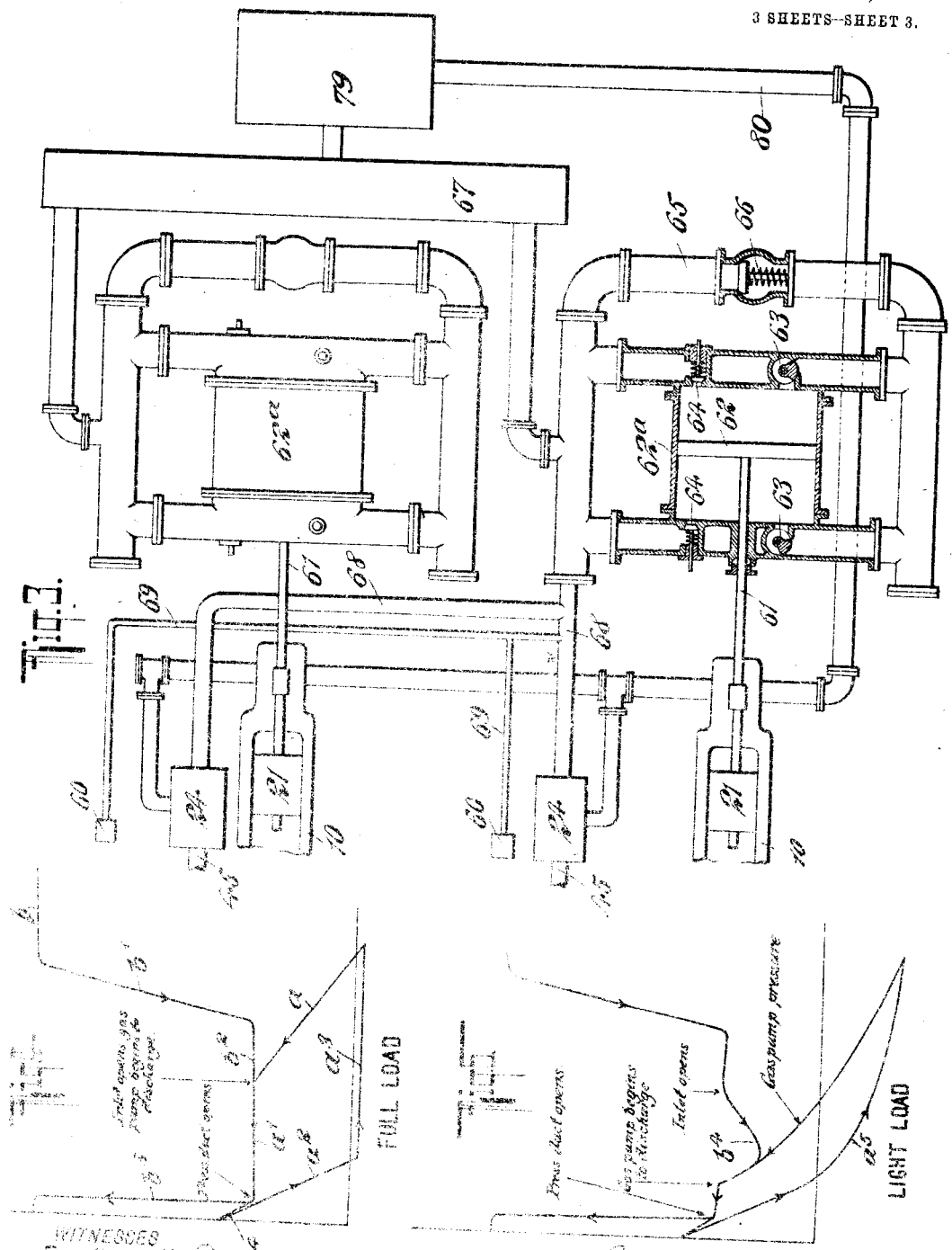

LOUIS ILLMER, JR., OF CINCINNATI, OHIO, ASSIGNOR TO ILLMER GAS ENGINE COMPANY, A CORPORATION OF DELAWARE.

INTERNAL-COMBUSTION ENGINE.

1,048,698.  Specification of Letters Patent.  Patented Dec. 31, 1912.

Application filed October 1, 1907. Serial No. 395,321.

*To all whom it may concern:*

Be it known that I, LOUIS ILLMER Jr., of the city of Cincinnati, county of Hamilton, State of Ohio, have invented certain new and useful Improvements in Internal-Combustion Engines, of which the following is a full, clear, and exact specification, such as will enable others skilled in the art to which it appertains to make and use the same.

My invention relates especially to double acting two cycle, scavenging air internal combustion engines using a gaseous fuel, but various of its principles may be adapted to engines operating in other cycles or with liquid or other fuels as will hereinafter appear.

It is an object of this invention to provide an engine which when used in a plant of multiple units will admit of concentrating the air pumps of the plant into a single pump or source of air pressure and which is so arranged that the mean effective pressure in the working cylinder may be increased without increasing correspondingly the initial explosion pressure. In some respects the present invention constitutes an improvement on the subject matter of my copending application, Serial Number 297,405, filed January 23, 1906.

My invention involves various other features of importance and all features will be fully set forth hereinafter and particularly pointed out in the claims.

The accompanying drawings show as an example the preferred manner of practically embodying the principles of the invention and in these drawings, Figure 1 is a horizontal section through the working cylinder and pumps of a double acting engine; Fig. 2 is a vertical section through the pumps and valves of the same. Fig. 3 is a diagram showing the concentration of the air pumping division of a plant of more than one engine and also showing use of the invention in connection with a blowing engine or engines; and Figs. 4 and 5 are diagrams representing approximate indicator cards showing the pump work at full and light loads respectively.

I will first describe the construction of the specific type of engine shown in the drawings and subsequently set forth its principle of operation.

Referring particularly to Figs. 1 and 2, 10 indicates a jacketed double acting two cycle gas engine working cylinder with the usual exhaust ports 11 intermediate its ends adapted to be covered by the double acting piston 12. At the ends of the cylinder are located heads 13 carrying housings 14 in which operate the inlet valves 15. These valves are preferably of the puppet type and surround the piston rods which as here shown project through the respective cylinder heads. According to the construction shown, the valves 15 are positively operated and this may be effected by any desired means, for example, by the push rods and rocker arms as hereinafter shown in my copending application, Serial No. 366,289 filed April 1, 1907. Outward from the valves 15 and housings 14 are arranged packing devices each composed of rings 16 and semicircular casing sections 17. These casing sections are bolted together around the rods 19 and are held in place by flanges 18 fastened to the cylinder heads. In this manner the packing devices may be readily removed for repair or adjustment of the packing or other parts.

The housings 14 communicate with the interiors of the respective cylinder heads and these in turn communicate with ducts 22 leading from tubular extensions 23 on the respective gas pump cylinders 24. Through these ducts 22 the explosive or combustible mixture and the scavenging air pass to the inlet valves and working cylinder as will hereinafter fully appear. The pump cylinders 24 are suitably mounted alongside the working cylinder 10; for example on the cylinder studs 25 which may, if desired, be made to carry as well, parts 26 of the inlet valve gear.

The tubular extensions 23 of the cylinders 24 communicate with chambers 27 in the outer ends of the cylinders which chambers are formed by walls 28 in the cylinders adjacent to their outer heads. The chambers 27 communicate with the main chambers of the cylinders 24 by ports 29 controlled by spring pressed check valves 30 opening into the chambers 27. 31 indicates the piston of the gas pump which operates respectively in the cylinders 24 and have ports 32 therein controlled by spring pressed check valves 33 opening toward the chambers 27 as the outer ends of the cylinders 24. 34 indicates by-pass grooves in the inner walls of the cylinders 24 adjacent to the walls 28 and outlet ends of the cylinders. The pistons 31 compress the gas until the pistons overrun the grooves 24ᵃ and then the gas ahead of the pistons by-passes through the grooves to the suction sides of the pistons and ceases to press against the valves 30. The pistons 31 of the gas pumps are joined to each other by a rod 34 and each piston has an enlarged tail rod 35 working snugly in tubular guides 36 within the extensions 23 of the pump cylinders. The pistons are driven through one of the tail rods in unison with the operation of the engine as will be hereinafter described. The driving motion may be communicated from any source but preferably from an eccentric on the crank shaft (not shown) to which eccentric a rod 37 is joined.

A jacket surrounding each pump cylinder 24 forms two chambers 38 and 39 of which the chambers 38 communicate with the main chambers of the pump cylinders by ports 40 and the chambers 39 communicate with the chambers 27. To each of the chambers 38 gas supply ducts 41 lead from a main 42 or other source; and to each of the chambers 39 compressed air ducts 43 and auxiliary air ducts 44 lead. The compressed air ducts 43 are supplied through connections 45 from a source which may be and preferably is entirely independent of the engine as will presently fully appear, while the auxiliary air ducts 44 communicate with each other by a cross connection 46 and are supplied from the ducts 43 through ports 47. The air ducts 44 and their connection 46 form a reservoir for a portion of the air introduced from the ducts 43, as will presently appear.

In each of the gas ducts 41 is arranged a damper valve 48. Similar valves 49 are arranged in the auxiliary air ducts 44. Above the valves 49 the auxiliary air ducts 44 are commanded by check valves 50 which open into the chambers 39 but close to prevent pressure from such chambers entering by way of the ends of the ducts 44. In the compressed air ducts 43 rotary cylinder valves 51 operate. These valves are ported as shown so that when in the adjustment shown at the right hand end of Fig. 2, the duct 43 will be open to the chamber 39 and the port 47 will be closed, and when in the adjustment shown at the left hand end of Fig. 2, the duct 43 will be cut off from the chamber 39 and the port 47 opened to said chamber, equalizing the pressure in the ducts 44 with that in the said chamber. The valves 51 are operated in unison with the engine by any desired means—preferably by a rocker arm 52 joined to the rod 34 and connected by a reach rod 53 and arms 54 with the stems of the valves. The valves 48 and 49 at each end of the engine are cross-linked to each other as at 55 and both pairs of valves are joined by a reach rod 56 and arms 57 and 58. Of these arms, the arm 58 is joined by a linkage 59 to a governor 60 whereby the valves 48 and 49 are controlled. The valves 51, therefore, have a regular rocking motion corresponding to the reciprocation of the engine while the valves 48 and 49 are normally open and are partly or wholly closed by the governor in turn responding to the load on the engine.

Such being the construction and arrangement of the type of engine illustrated, I shall now set forth its operation and the important functions of my invention.

In the operation of the engine, gas is supplied to the ducts 41, preferably under low pressure such for example as that usually incident to blast furnace or pressure gas producer gas, and air is supplied to the ducts 43 from the connections 45 at a comparatively high pressure such for example as 15 pounds gage to the square inch. From the ducts 41 the gas passes into and pervades the chambers 38 and the cylinders 24 on the suction sides of the pistons 31 and from the ducts 43 the compressed air passes, subject to the valves 51, into the chambers 27 and their connections, and from these chambers and their connections some of the air therein passes also subject to the valves 51, into the auxiliary ducts 44 charging the same with air at a low pressure such for example as 3 to 5 pounds gage to the square inch. Assuming that a working charge has been duly entered and compressed in the left hand end of the engine and such charge ignited and exploded in the usual manner, the piston 21 will move rightward on its working stroke until the exhaust ports 11 are uncovered and the residual pressure in the left hand end of the cylinder will thereupon fall to atmosphere. At this time the left hand duct 22 and cylinder head 12 will be full of pure air from the left hand duct 44 at low pressure, and the instant the exhaust ports are uncovered the left hand inlet valve 15 will be opened and such air will flow into and through the working cylinder scavenging it of the residual products of combustion. During the above described operating stroke of the piston 21, the left hand pump piston 31 will be moving leftward slightly compressing the gas ahead of it and this gas will after the inlet valve is opened as described, flow into and from the left hand chamber 27 and mixing with the air flowing from the duct 44 will form a stratum of explosive mixture which follows up the aforesaid stratum of scavenging air and passing the inlet valve enters the cylinder. The action of the parts is so timed that as the advancing face of the incoming mixing charge approaches the exhaust ports, the piston, beginning its compression stroke, will cover the exhaust ports and at this time the working charge extends as far back as the cylinder head and duct 22, the inlet valve still being open.

When the conditions described above obtain the valve 51, which was previously closed, is opened to admit the high pressure air from the left hand duct 43 into the chamber 27, and its connections. Thereupon the left hand check valve 50 is closed to prevent the pressure from passing into the duct 44 and simultaneously the pump piston 31 overruns the grooves 24$^a$ and the gas remaining ahead of the piston is by-passed to the suction side, with the result that the pressure tending to open the valves 30 is relieved and the high pressure air now in the chamber 27 quickly closes these valves 30 instantly cutting off the gas supply. This high pressure air is now passing on from the chamber 27 into and through the duct 22 pushing ahead of it the mixture charge which it will be remembered was but partly entered into the cylinder. The high pressure air is thus acting against the pressure of the advancing piston and the operation of the parts is so timed that as the pressure created by the piston is about to balance that of the high pressure air from the duct 43, the mixture charge will be completely pressed into the cylinder and thereupon the inlet valve is closed. These operations take place before the piston has materially advanced on its compression stroke and the result is that the charge is pressed into the cylinder at a pressure considerably above the atmosphere line which pressure is further increased by the compression stroke of the piston and in this manner the mean effective working pressure following the explosion is increased without a corresponding increase in the initial explosion pressure, all of which is fully set forth in my copending application above referred to. At the time that high pressure air from the duct 43 introduces the charge into the working cylinder and the inlet valve closes, this air will lie back of the inlet valve and in the duct 22 and chambers 23, 27 and 39. At this time the left hand valve 51 reverses its position cutting off the air from the duct 43 and opening the left hand duct 44 to the chamber 39 through the port 47, with the result that the high pressure in the chamber 39 and its connections equalizes with that in the duct 44 replenishing the pressure supply therein preparatory to a repetition of the above described operation.

Regulation of the engine is effected by the action of the governor on the valves 48 and 49 throttling the gas and air supplies, so that the gas pumps, acting directly in unison with the working piston, draw in and discharge quantities of gas measured in accordance with the load on the engine and the mixture air passing the valves 49 at low pressure is throttled to retain its proper proportion to the reduced quantity of gas discharged from the pumps. The governing action is well indicated in the approximate indicator cards, Figs. 4 and 5. Referring to Fig. 4, showing full load conditions; the line $a$ represents the rise of pressure gas due to the compression stroke of the gas pump; $a'$ the state of gas pressure after the inlet valve is opened and while the mixture is entering the working cylinder by reason of its own pressure. The point $b$ on the card shows the relation of the high pressure air from the duct 43 to the other pressures; the line $b'$ the drop in this pressure as the chambers 39, 27, etc., equalize with the duct 44; and the horizontal line $b^2$ the movement of this air at constant pressure along with the gas into the working cylinder as the mixture charge. The rising pressure line $b^3$ shows the increase in the pressure of the charge due to the action of the high pressure air from the duct 43 following the mixture charge and compressing it into the cylinder. The branching line $a^1$ represents the by-passing of the gas through the grooves 24$^a$ or its equivalent; to wit, the compression of the gas in the clearance space of the pumps after the valves 30 are closed. $a^2$ and $a^3$ in Fig. 4 show the pressure drop and suction due to the return of the pump piston preparatory to its next working stroke. The conditions under light load are clearly indicated in Fig. 5 where $a^5$ shows the throttling of the gas on the suction stroke of the piston due to partial closing of the valve 48 and $b^4$ the corresponding reduction in the mixture or low pressure air supply due to partial closing of the valve 49 whereby correct proportion of the air and gas is secured.

It will be seen that at light load the gas pump discharge is much delayed and the gas charge is delivered in measured quantities exactly proportionate to the load.

It will also be perceived, notwithstanding that the engine works with air at two different pressures, that this air is derived from a single high pressure source a part being subsequently reduced in pressure to supply the mixture air. Broadly the air pressure may be derived from any available source, but there are important principles of my invention concerned with the relation of the air supply to the organism as so far described. In modern engineering the necessity of plants of large power has led to the erection of a number of units and ordinarily these units are each provided with separate air pumps. This practice involves much loss from pump work due to the necessity of a number of comparatively small inefficient pumps, and for this reason it is desirable to concentrate the pumping side of the plant as much as possible. Under some conditions both the air and gas pumps of a plant may with advantage be concentrated into single units, but where considerable regulation is necessary and plants of comparatively small numbers of units are involved, I have found it most advantageous to fit each engine with its separate gas pumps and concentrate the air pumps into a single unit, and it is to such an arrangement that my present invention has special reference. According to this, where a number of engines are operative together the air ducts 43 thereof are connected to a single pump or other source of air pressure, and where but one engine is employed, the air pump may be coupled thereto, for example, the tail rod of the engine.

Following this my invention has special and peculiar advantages when combined with blowing engines supplying blast furnaces, and when so organized and supplied with fuel from the exhaust gases of the furnace it represents one of the most economical known form of prime movers. Fig. 3 represents my manner of effecting the organization referred to, in which the tail rod of the engine is direct coupled to the piston rod 61 of a blowing engine piston 62. The cylinder 62ª of the blowing engine is fitted with the usual suction valves 63 and discharge valves 64, the suction and discharge sides being joined by a connection 65 in which is a spring seated by-pass valve 66, designed to by-pass excessive pressure to the suction side of the engine. 67 indicates the pipe line to the furnace. Blast furnace blowing engines are usually operated at about 15 lbs. pressure to the square inch and as hereinbefore stated this is the pressure at which it is preferred to work the air in the ducts 43, and following this I take a branch pipe 68 from the blowing engine main and lead same to the connections 45. If a number of gas engines are working a corresponding number of blowing engines a single connection 68 from any point in the air main will serve all of the gas engines thus clearly effecting an important saving in the air pump's work of the gas engines. Fig. 3 also shows one of the furnaces 79 and a connection 80 to conduct the exhaust gases to the engines by which gases the engines are operated.

The air blast supply to the furnace in practice varies greatly and to accommodate the organism to this condition, I govern the engine under the control of the blast pressure, so that upon the accumulation of excessive pressure the engine is slowed down and speeded up as the pressure drops. For this purpose a pipe 69 is taken off at any convenient point in the blowing engine line and led to a cylinder 70 forming a part of the governor 60. In this cylinder a piston 71 operates back of which is a spring 72 resisting the air pressure from the pipe 69. The rod of this piston 71 is articulated to one arm of a lever 73 fulcrumed on the stationary column 74 of the governor, while the other arm of the lever 73 is articulated to a link 75, extending upward and articulated to an arm of a second lever 76. The lever 76 is fulcrumed on the hub 77 of the governor which hub, it will be understood, moves back and forth on the vertical governor-spindle according to the action of the governor. The second arm of the lever 76 is joined to a link 78 which extends downward and is articulated to the elbow lever 59 of the air and gas throttle valves 48 and 49. Normally these valves 48 and 49 are set to allow a full load card (as for instance the approximate card in Fig. 4) with the lever 76 substantially horizontal, but should the pressure in the blowing engine mains become excessive, the piston 71 will be depressed and the vertical arm of the elbow lever rocked leftward thereby closing or partly closing the air and gas valves and slowing down the engine. This operation it will be perceived does not affect and is not at first affected by the governor. Where however the engine feels the effect of the throttling action the governor hub will drop tending to restore the lever 76 to its horizontal position and tending to return the valves 48 and 49 to full open position. These opposing forces, therefore, are acting at intervals as stated and between them the speed of the engine or engines is kept in unison with the requirements in the blowing engine mains.

Having thus described my invention, what I claim as new and desire to secure by Letters Patent of the United States, is:

1. The combination with a plurality of blowing engines, of gas engines for driving the same, means associated with each of the gas engines for diverting a portion of the air from the blowing engines to the cylinders of the gas engines for producing and injecting the explosive charges thereto, connections between the blowing engines and said means for conveying the air to the latter, a governor device associated with each gas engine, and connections separate from the first-mentioned connections between said governor devices and the blowing engines for causing the governors to respond to the variations in the blowing-engine pressure.

2. The combination with a blowing engine, of a gas engine for driving the same, means associated with said gas engine for diverting a portion of the air from the blowing engine to the cylinder of the gas engine for producing and injecting the explosive charges thereto, connections between the blowing engine and said means for conveying the air to the latter, a governor device associated with said gas engine, and connections separate from the first-mentioned connections between said governor device and the blowing engine for causing the governor to respond to variations in the blowing-engine pressure.

3. The combination with a blowing-engine, of a gas engine for driving the same, a governor associated with the gas engine and connected to the latter to normally maintain the engine at full speed, a fluid-pressure device forming a part of the governor and responsive only to excess blowing-engine pressure, whereby to reduce the speed of the gas engine, and means acting in opposition to the fluid-pressure to restore the engine to full speed upon reduction of the fluid-pressure.

4. The combination of a gas engine, a gas pump direct coupled thereto and forming a part thereof, a blowing engine driven from the gas engine, means for supplying high pressure air to the gas engine from the blowing engine and a reservoir at the gas engine in which part of the high pressure air is stored at reduced pressure whereby to furnish air at two pressures from a single source for the purpose specified.

5. The combination of a gas engine, a gas pump direct coupled thereto and forming a part thereof, a blowing engine driven from the gas engine, means for supplying high pressure air to the gas engine from the blowing engine, a reservoir at the gas engine in which part of the high pressure air is stored at reduced pressure whereby to furnish air at two pressures from a single source for the purpose specified, a pressure controlled device for governing the gas engine and means for supplying air thereto from the blowing engine.

6. A gas engine having means supplying air at relatively high pressure, a reservoir in which such air is stored at reduced pressure, whereby to supply the engine with air at two pressures from a single source and means controlling the movement of the air at such pressures.

7. A gas engine having means supplying air at relatively high pressure, a reservoir in which such air is stored at reduced pressure whereby to supply the engine with air at two pressures from a single source, and independently operated means controlling the movement of the air at such pressures.

8. A gas engine having means supplying air at relatively high pressure, a reservoir in which such air is stored at reduced pressure, whereby to supply the engine with air at two pressures from a single source, means controlling the movement of the air at such pressures, and a gas supply means with which the low pressure air is combined to form the explosive mixture.

9. A gas engine having means supplying air at relatively high pressure, a reservoir in which such air is stored at reduced pressure, whereby to supply the engine with air at two pressures from a single source, means controlling the movement of the air at such pressures, a gas supply means with which the low pressure air is combined to form the explosive mixture, and a valve for controlling the flow of gas in accordance with the flow of low pressure air.

10. A gas engine having a gas supply, a high pressure air supply, a reservoir into which the high pressure air is stored at reduced pressure to form a low pressure air supply and means for controlling the air and gas flow, whereby the low pressure air flows with the gas to form the explosive mixture and the high pressure air follows to press the charge into the cylinder at high initial pressure.

11. A gas engine having a gas supply, a high pressure air supply, a reservoir in which high pressure air is stored at reduced pressure to form a low pressure air supply, means controlling low pressure air flow from the reservoir to the working cylinder, and means controlling flow of the high pressure air, whereby the low pressure air and the gas flow together to form the explosive mixture and the high pressure air follows to press the charge into the cylinder at high initial pressure.

12. A gas engine having a reservoir, gas and air supplies for the engine, a duct with which the engine, gas and air supplies and the reservoir communicate, the duct leading to the working cylinder, an inlet valve controlling communication between the duct and the working cylinder, means for admitting high pressure air to the duct to press the charge into the working cylinder and for subsequently equalizing the pressure in the duct with that in the reservoir, the inlet valves subsequently allowing air remaining in the duct to flow into the working cylinder to scavenge it and means for allowing air to flow from the reservoir with the gas to form the next following working charge.

13. A gas engine having a reservoir, gas and air supplies for the engine, a duct with which the engine, gas and air supplies and the reservoir communicate, the duct leading to the working cylinder, an inlet valve controlling communication between the duct and the working cylinder, means for admitting high pressure air to the duct to press the charge into the working cylinder and for subsequently equalizing the pressure in the duct with that in the reservoir, the inlet valve subsequently allowing air remaining in the duct to flow into the working cylinder to scavenge it and means for allowing air to flow from the reservoir with the gas to form the next following working charge, and governor controlled means for synchronously throttling the flow from the reservoir and the flow of gas to regulate the engine.

14. A gas engine having a duct leading to the working cylinder, an inlet valve to the cylinder, a compressed air supply communicating with the duct, a gas supply communicating with the duct, a reservoir communicating with the duct and means controlling the movement of the air and gas, whereby the compressed air flows into the duct to press the charge into the cylinder, the air pressing in the duct to equalize with that in the reservoir, the air remaining in the duct flows into the cylinder to scavenge it and the low pressure air in the reservoir flows with the gas to form the next following working charge.

15. A gas engine having a duct leading to the working cylinder, an inlet valve to the cylinder, a compressed air supply communicating with the duct, a gas supply communicating with the duct, a reservoir communicating with the duct, means controlling the movement of the air and gas, whereby the compressed air flows into the duct to press the charge into the cylinder, the air pressure in the duct equalizes with that in the reservoir, the air remaining in the duct flows into the cylinder to scavenge it and the low pressure air in the reservoir flows with the gas to form the next following working charge, and means for synchronously throttling the flow of air and gas during the formation of the working charge.

16. A gas engine having a duct leading to the working cylinder, an inlet valve to the cylinder, a compressed air supply communicating with the duct, a gas pump discharging into the duct, a reservoir communicating with the duct and means controlling the movement of the air, whereby the compressed air flows into the duct to press the charge into the cylinder, the air pressure in the duct equalizes with that in the reservoir, the air remaining in the duct flows into the cylinder to scavenge it and the low pressure air in the reservoir flows with the gas on the discharge of the pump to form the next following working charge.

17. A gas engine having a duct leading to the working cylinder, an inlet valve to the cylinder, a compressed air supply communicating with the duct, a gas pump discharging into the duct, a reservoir communicating with the duct, means controlling the movement of the air, whereby the compressed air flows into the duct to press the charge into the cylinder, the air pressure in the duct equalizes with that in the reservoir, the air remaining in the duct flows into the cylinder to scavenge it and the low pressure air in the reservoir flows with the gas on the discharge of the pump to form the next following working charge, and means for synchronously throttling the flow of air from the reservoir and the supply of gas to the pump.

18. A gas engine having a duct leading to the working cylinder, an inlet valve to the cylinder, a compressed air supply communicating with the duct, a gas pump discharging into the duct, a reservoir communicating with the duct, means controlling the movement of the air, whereby the compressed air flows into the duct to press the charge into the cylinder, the air pressure in the duct equalizes with that in the reservoir, the air remaining in the duct flows into the cylinder to scavenge it and the low pressure air in the reservoir flows with the gas on the discharge of the pump to form the next following working charge, and governor controlled means for synchronously throttling the flow of air from the reservoir and the supply of gas to the pump.

19. A gas engine having a duct leading to the working cylinder, an inlet valve to the cylinder, a compressed air supply communicating with the duct, a gas supply communicating with the duct, a reservoir communicating with the duct, means controlling the movement of the air and gas, whereby the compressed air flows into the duct to press the charge into the cylinder, the air pressure in the duct equalizes with that in the reservoir, the air remaining in the duct flows into the cylinder to scavenge it and the low pressure air in the reservoir flows with the gas to form the next following working charge, and governor controlled means for synchronously throttling the flow of air and gas during the formation of the working charge.

20. A gas engine having a duct leading to the working cylinder, an inlet valve to the working cylinder, a compressed air supply communicating with the duct, a reservoir communicating with the duct, a gas supply communicating with the duct, valves controlling communication between the reservoir and gas supply and the ducts, and means actuated in unison with the engine for controlling the air movement, whereby the compressed air is first admitted to the duct and the pressure in the duct equalized with that in the reservoir.

21. A gas engine having a duct leading to the working cylinder, an inlet valve to the working cylinder, a compressed air supply communicating with the duct, a reservoir communicating with the duct, a gas supply communicating with the duct, valves controlling communication between the reservoir and gas supply and the duct, and means actuated in unison with the engine for controlling the air movement, whereby the compressed air is first admitted to the duct and the pressure in the duct equalized with that in the reservoir, such means comprising a double ported valve successively opening communication between the compressed air supply and the duct and the duct and the reservoir.

22. A gas engine having a duct leading to the working cylinder, an inlet valve to the working cylinder, a compressed air supply communicating with the duct, a reservoir communicating with the duct, a gas supply communicating with the duct, valves controlling communication between the reservoir and gas supply and the duct, and means for controlling the air movement, whereby the compressed air is first admitted to the duct and the pressure in the duct equalized with that in the reservoir.

23. A gas engine having a duct leading to the working cylinder, an inlet valve to the working cylinder, a compressed air supply communicating with the duct, a gas supply communicating with the duct, valves controlling communication between the reservoir and gas supply and the duct, and means for controlling the air movement, whereby the compressed air is first admitted to the duct and the pressure in the duct equalized with that in the reservoir, such means comprising a double ported valve successively opening communication between the compressed air supply and the duct and the duct and the reservoir.

24. A gas engine having a duct leading to the working cylinder, an inlet valve to the working cylinder, a compressed air supply communicating with the duct, a reservoir communicating with the duct, a gas supply communicating with the duct, valves controlling communication between the reservoir and gas supply and the duct, and means actuated in unison with the engine for controlling the air movement, whereby the compressed air is first admitted to the duct and the pressure in the duct equalized with that in the reservoir, and governor controlled means for regulating the flow of gas and reservoir air into the duct.

25. A gas engine having a duct leading to the working cylinder, an inlet valve to the working cylinder, a compressed air supply communicating with the duct, a reservoir communicating with the duct, a valve controlling communication between the reservoir and the duct, a gas pump discharging into the duct, and means controlling the movement of the air, whereby the compressed air flows into the duct and the pressure in the duct is equalized with that in the reservoir.

26. A gas engine having a duct leading to the working cylinder, an inlet valve for the working cylinder, a compressed air supply communicating with the duct, a reservoir communicating with the duct, a valve controlling communication between the reservoir and the duct, a gas pump discharging into the duct and means actuated in unison with the engine for controlling the movement of the air, whereby the compressed air flows into the duct and the pressure in the duct is equalized with that in the reservoir.

27. A gas engine having a duct leading to the working cylinder, an inlet valve to the working cylinder, a compressed air supply communicating with the duct, a valve controlling communication between the reservoir and the duct, a gas pump discharging into the duct, means actuated in unison with the engine for controlling the movement of the air, whereby the compressed air flows into the duct and the pressure in the duct is equalized with that in the reservoir, and governor controlled means for regulating the gas supply to the pump and the flow of air from the reservoir.

28. A gas engine having a duct leading to the working cylinder, an inlet valve to the working cylinder, a compressed air supply communicating with the duct, a reservoir communicating with the duct, a valve controlling communication between the reservoir and the duct, a gas pump discharging into the duct, and means controlling the movement of the air, whereby the compressed air flows into the duct and the pressure in the duct is equalized with that in the reservoir, said means comprising a two ported valve successively opening the compressed air supply to the duct and the duct to the reservoir.

29. A gas engine having a duct leading to the working cylinder, an inlet valve to the working cylinder, a gas pump discharging into the duct, a compressed air supply to the duct, a reservoir communicating with the duct and having a port into the compressed air supply, a valve controlling communication between the reservoir and duct, and a double multiple valve serving successively to open communication between the compressed air supply and the duct and the duct and the reservoir.

30. A gas engine having a duct leading to the working cylinder, an inlet valve to the working cylinder, a gas pump discharging into the duct, a compressed air supply to the duct, a reservoir communicating with the duct and having a port into the compressed air supply, a valve controlling communication between the reservoir and duct, and a multiple valve serving successively to open communication between the compressed air supply and the duct and the duct and the reservoir, governor controlled means for simultaneously fixing the gas supply to the pump and the flow of air from the reservoir to the duct.

31. A gas engine having a duct leading to the working cylinder, an inlet valve to the working cylinder, a gas pump discharging into the duct, a compressed air supply to the duct, a reservoir communicating with the duct and having a port into the compressed air supply, a valve controlling communication between the reservoir and duct and a multiple valve serving successively to open communication between the compressed air supply and the duct and the duct and the reservoir, governor controlled means for synchronously throttling the gas supply to the pump and the flow of air from the reservoir to the duct, and means for driving the gas pump in unison with the engine.

32. A gas engine having a duct leading to the working cylinder, an inlet valve to the working cylinder, a gas pump discharging into the duct, a compressed air supply to the duct, a reservoir communicating with the duct and having a port into the compressed air supply, a valve controlling communication between the reservoir and duct, a multiple valve serving successively to open communication between the compressed air supply and the duct and the duct and the reservoir, governor controlled means for synchronously throttling the gas supply to the pump and the flow of air from the reservoir to the duct, and means for driving the gas pump and said multiple valve in unison with the engine.

33. A gas engine having a duct leading to the working cylinder, an inlet valve to the working cylinder, a compressed air supply communicating with the duct, a reservoir communicating with the duct, a valve controlling communication between the reservoir and the duct, means actuated in unison with the engine for controlling the movement of the air, whereby the compressed air flows into the duct and the pressure in the duct is equalized with that in the reservoir, governor controlled means for regulating the gas supply to the pump and the flow of air from the reservoir, and means for driving the gas pump in unison with the engine.

34. A gas engine having a duct leading to the working cylinder, an inlet valve to the working cylinder, a compressed air supply communicating with the duct, a reservoir communicating with the duct, a valve controlling communication between the reservoir and the duct, a gas pump discharging into the duct, and means actuated in unison with the engine for controlling the movement of the air, whereby the compressed air flows into the duct and the pressure in the duct is equalized with that in the reservoir, governor controlled means for regulating the gas supply to the pump and the flow of air from the reservoir, and means for driving the gas pump, and said means controlling the movement of the air in unison with the engine.

35. A gas engine having a duct leading to the working cylinder, an inlet valve to the working cylinder, a compressed air supply communicating with the duct, a reservoir communicating with the duct, a valve controlling communication between the reservoir and the duct, a gas pump discharging into the duct, and means controlling the movement of the air, whereby the compressed air flows into the duct and the pressure in the duct is equalized with that in the reservoir, and means for shutting off the gas pump discharge near the end of its stroke.

36. A gas engine having a duct leading to the working cylinder, an inlet valve to the working cylinder, a gas pump discharging into the duct, a compressed air supply to the duct, a reservoir communicating with the duct and having a port into the compressed air supply, a valve controlling communication between the reservoir and duct, and a multiple valve serving successively to open communication between the compressed air supply and the duct and the duct and the reservoir, and means for shutting off the gas pump discharge near the end of its stroke.

37. A gas engine having a gas pump discharging at one end and an air supply chamber surrounding the pump and discharging at said end into the gas discharged by the pump.

38. A gas engine having a gas pump with means for reducing its compression near the end of stroke, a duct passing the discharge end of the pump and into which the pump discharges, a check valve opening from the pump to the duct and means for admitting compressed air to said duct, the compressed air serving to close the check valves.

39. A gas engine having a gas pump with means for reducing its compression near the end of stroke, a duct passing the discharge end of the pump and into which the pump discharges, a check valve opening from the pump to the duct and means for admitting compressed air to said duct, the compressed air serving to close the check valves, said means for reducing the compression near the end of the pump stroke comprising a by-pass groove in the inner wall of the pump chamber adapted to be overrun by the pump piston.

In testimony whereof I have signed my name to this specification in the presence of two subscribing witnesses.

LOUIS ILLMER, JR.

Witnesses:
RALPH R. CALDWELL,
ARTHUR M. SPIEGEL.